(12) United States Patent
Plavetich et al.

(10) Patent No.: US 8,066,569 B2
(45) Date of Patent: Nov. 29, 2011

(54) MIRROR/DISPLAY ASSEMBLY

(75) Inventors: Richard Plavetich, Laguna Beach, CA (US); John Cupit, Olivenhain, CA (US)

(73) Assignee: Nissan North America, Inc., Franklin, TN (US)

( * ) Notice: Subject to any disclaimer, the term of this patent is extended or adjusted under 35 U.S.C. 154(b) by 1738 days.

(21) Appl. No.: 11/316,666

(22) Filed: Dec. 22, 2005

(65) Prior Publication Data

US 2007/0146560 A1     Jun. 28, 2007

(51) Int. Cl.
*A63F 9/24* (2006.01)
(52) U.S. Cl. .......................................... 463/42; 248/476
(58) Field of Classification Search .................... 463/42; 248/476
See application file for complete search history.

(56) References Cited

U.S. PATENT DOCUMENTS

| 6,557,812 | B2 * | 5/2003 | Kutzehr et al. | 248/476 |
| 2001/0050329 | A1 * | 12/2001 | Kutzehr et al. | 248/476 |
| 2006/0208169 | A1 * | 9/2006 | Breed et al. | 250/221 |
| 2007/0171037 | A1 * | 7/2007 | Schofield et al. | 340/438 |

OTHER PUBLICATIONS

Mark Vaughn, Spirited Speedster: It Lets You Race Even When It's in Park (AutoWeek), Nov. 14, 2005, pp. 16-17.

* cited by examiner

*Primary Examiner* — Pierre E Elisca
(74) *Attorney, Agent, or Firm* — Young Basile Hanlon & MacFarlane, P.C.

(57) ABSTRACT

An integrated mirror/display assembly includes a flip down display integrated with a rearview mirror. The mirror may be mounted to the display and the mirror/display is movable on a pivot between a retracted non-viewing position during normal vehicle operation and an extended viewing position when the vehicle is not in an operating mode.

13 Claims, 3 Drawing Sheets

US 8,066,569 B2

MIRROR/DISPLAY ASSEMBLY

FIELD

The present invention relates generally to display monitors in vehicles and in particular the present invention relates to integrated display monitors.

BACKGROUND

Displays in vehicles are becoming commonplace. For example, DVD or other video screens are commonly used in family vehicles to display movies or the like for passengers while the vehicle is moving. LCD displays and the like are also used in navigation systems and mapping systems designed to be used while the vehicle is in motion. These fixed, drop down, or flip down displays are typically mounted to seatbacks, or flip down from the ceiling of a vehicle.

Displays for a driver of a vehicle are typically placed in a position which is viewable from the driver's seat, but do not obstruct a field of view for driving. However, such displays are typically in awkward positions for use when the vehicle is not in driving operation.

SUMMARY

The above-mentioned problems with monitors and other problems are addressed by the present invention and will be understood by reading and studying the following specification.

In one embodiment, a mirror assembly for a vehicle includes a monitor pivotally attached to the mounting frame, the monitor having a monitor display screen and a mirror, the monitor movable between a first retracted position and a second extended position.

In another embodiment, a mirror assembly for a vehicle including a housing and a display/mirror pivotally mounted to the housing, and movable between a first retracted position and a second extended position. The display/mirror includes a display and a mirror, the mirror and the display mounted substantially perpendicular to each other, the mirror having a mirror plane that substantially faces a rear of the vehicle when the display/mirror assembly is in the retracted position, the display having a display screen that substantially faces the rear of the vehicle when the display/mirror assembly is in the extended position.

In yet another embodiment, a mirror assembly for a vehicle includes a mounting frame, a monitor pivotally attached to the mounting frame, the monitor having a display and a mirror, the monitor movable between a first retracted position and a second extended position, an actuator connected to the monitor to actuate movement of the monitor between the first and the second positions, and a lockout mechanism to monitor an external vehicle status signal to prevent movement of the monitor from the first position to the second position when the external vehicle status signal indicates that the vehicle is in a driving mode of operation.

Other embodiments are described and claimed.

DETAILED DESCRIPTION

Figure 1:
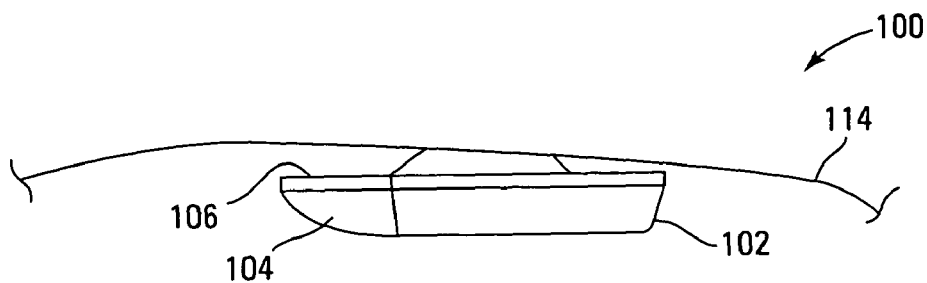
FIG. 1 is an isometric view of a mirror/display assembly according to one embodiment of the present invention.
Figure 2:
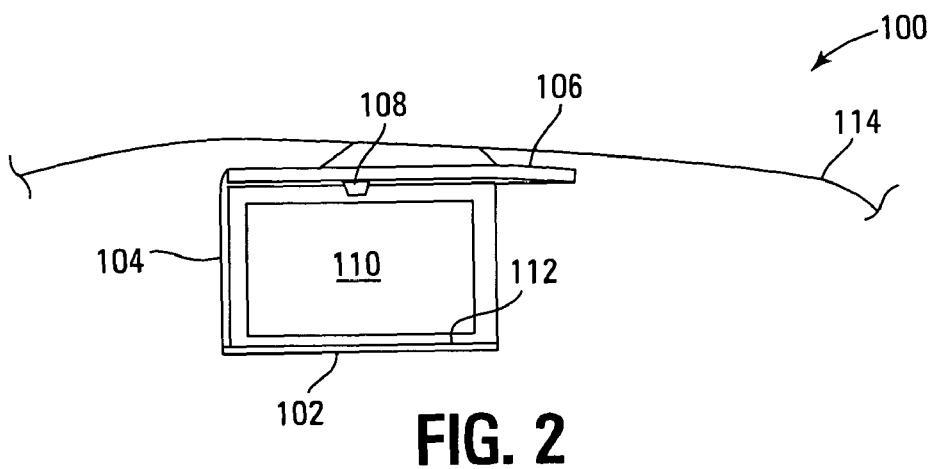
FIG. 2 is an isometric view of the mirror/display assembly of FIG. 1 with the display in an extended position.
Figure 3:
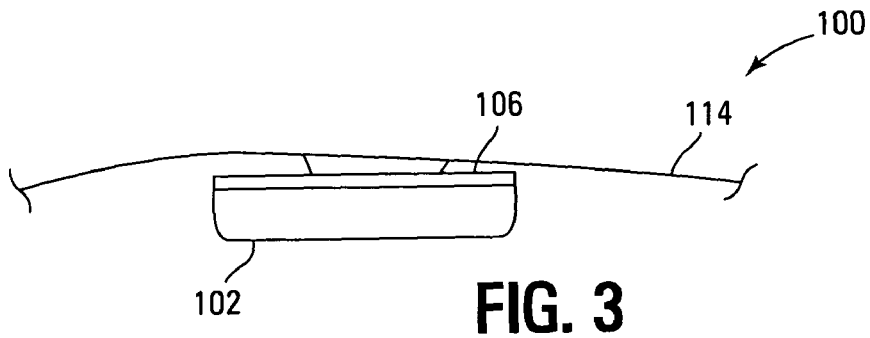
FIG. 3 is a front elevation view of the mirror/display assembly of FIG. 1.
Figure 4:
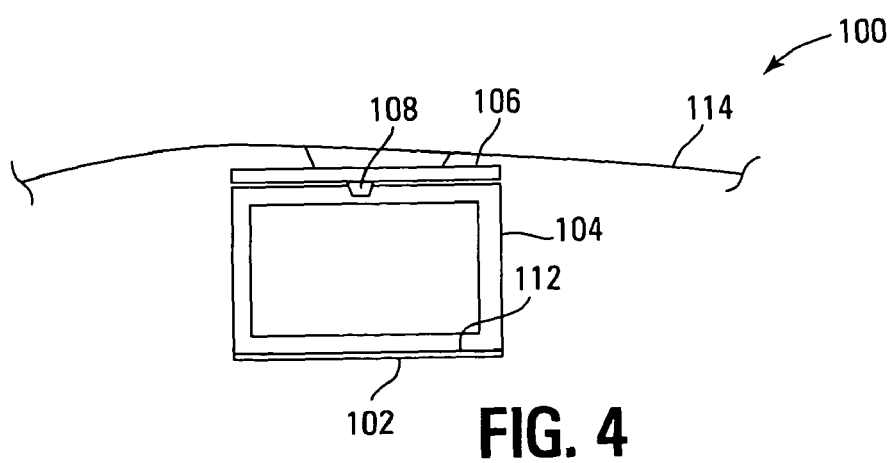
FIG. 4 is a side elevation view of the mirror/display assembly of FIG. 1.
Figure 5A:
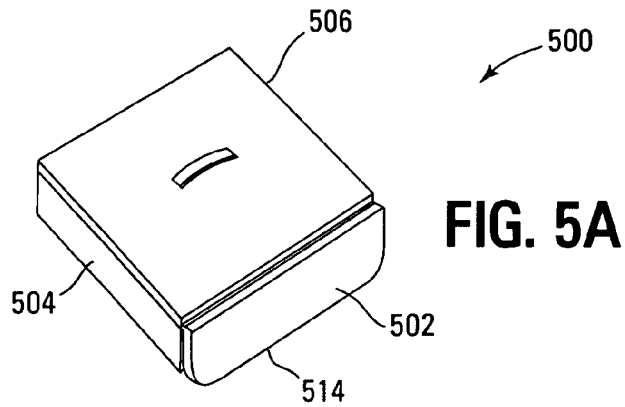
FIGS. 5A-5E are views of an alternative embodiment of a mirror/display according to another embodiment of the present invention.
Figure 5B:
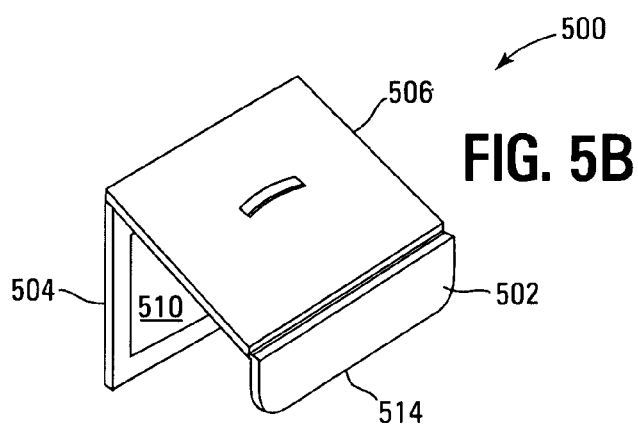
Figure 5E:
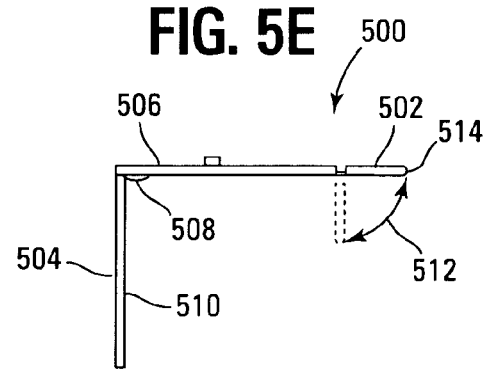
Figure 5C:
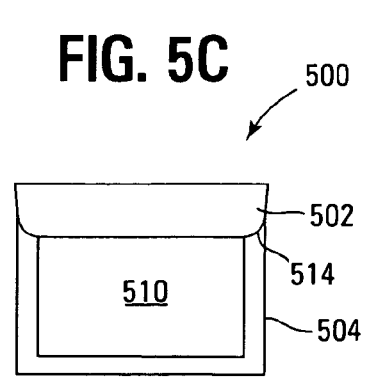
Figure 5D:
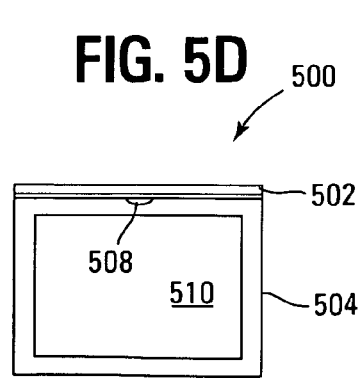

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

Generally, a rearview mirror/display assembly comprises a display or monitor hingedly attached to a body of the assembly adjacent to the top of a windshield of a vehicle. On the distal end of the monitor from a hinge point is a conventional rearview type mirror. The assembly has a first retracted position and a second extended position. When the assembly is in the retracted position, the monitor faces generally upward and is hidden from view of the driver of the vehicle, and the mirror is oriented such that the plane of the mirror is generally vertical and facing toward the rear of the vehicle. When the assembly is in the extended position, the monitor is generally vertically oriented and facing toward the rear of the vehicle. The mirror is generally horizontally oriented and facing downward.

One embodiment of a vehicle mirror/display assembly 100 is shown in FIGS. 1-4. Assembly 100 is a combination mirror and rear view monitor assembly, and comprises a rear view mirror portion 102 and a display portion 104. The display portion 104 is pivotally attached to a mounting frame 106 along pivot 108 for the mirror to allow the display portion 104 to pivot as is shown in greater detail in FIGS. 2 and 4 from a first, stored or retracted position to a second, viewing or extended position. In the stored position, the mirror 102 is visible to a driver of the vehicle, and is used as a standard rearview mirror. In the second, viewing position, the display portion 104 is pivoted at pivot 108 so that a display 110, such as an LCD or plasma display, is in position to be seen by a driver of the vehicle. Mounting frame is attached to a vehicle 114 in an appropriate position for operation of the mirror portion 102 as a rearview mirror.

In this embodiment, at the distal end 112 of the monitor from the pivot axis 108 is a conventional rearview type mirror 102. The assembly has a first retracted position and a second extended position. When the assembly is in the retracted position, the monitor faces generally upward and is hidden from view of the driver of the vehicle, and the mirror is oriented such that the plane of the mirror is generally vertical and facing toward the rear of the vehicle. When the assembly is in the extended position, the monitor is generally vertically oriented and facing toward the rear of the vehicle. The mirror is generally horizontally oriented and facing downward. The mirror portion 102 rotates with the display portion 104, so that in the viewing position, the mirror is at the bottom 112 of the display 110. In one embodiment, the surface of the mirror and the surface of the monitor are generally perpendicular. In another embodiment, the mirror 102 is adjustable independently of the display while still being integrated with the display.

In one embodiment, pivot 108 is a hinge or the like allowing the display 104 to pivot along an axis coextensive with the forward-most portion of the mounting frame 106. In another embodiment, pivot 108 is a pivot point that allows pivoting of the monitor 104 in two directions, allowing the monitor to pivot from its retracted to its extended position, and also allowing the monitor to swivel about pivot 108 once it is in its extended position. The swivel allows the monitor to be positioned to be more easily viewed by a driver of the vehicle when the monitor is in its extended position.

In another embodiment shown in FIGS. 5A-5E, an alternative mirror/display assembly 500 comprises a mirror portion 502, a display or monitor portion 504, and a mounting frame 506. In this embodiment, the mirror portion 502 is independent of the display portion 504, which flips down on a pivot point 508 independently of the mirror 502 to show display 510. In this embodiment, the mirror 502 may fold up and down as shown by arrow 512 in FIG. 5E to allow the display 504 to be better displayed, or the display portion 504 may flip down to a point below the bottom edge 514 of the mirror portion 502 so that the display 510 on the display portion 504 is not obscured.

In some embodiments, the display such as display 104 or 504 is pivoted or extended to its operating or extended position only when the vehicle is not in a driving mode of operation, for example when the vehicle is shut off, or in a parked gear, or the like. Examples of interlocks to prevent the operation of the display such as display 104 or 504 include requiring a key of the vehicle to be in a certain detent position different from a detent position allowing driving operation of the vehicle, for example. In one embodiment, the flip down display portion is operably connected with the ignition to lock out use and extension of the monitor electronically. In other embodiments, the display is operably connected with the transmission. Any logical connection allowing the lockout of operation of the monitor in the extended position during vehicle driving operation is amenable to use with the embodiments of the present invention, and is within the scope of the invention.

Figure 6:
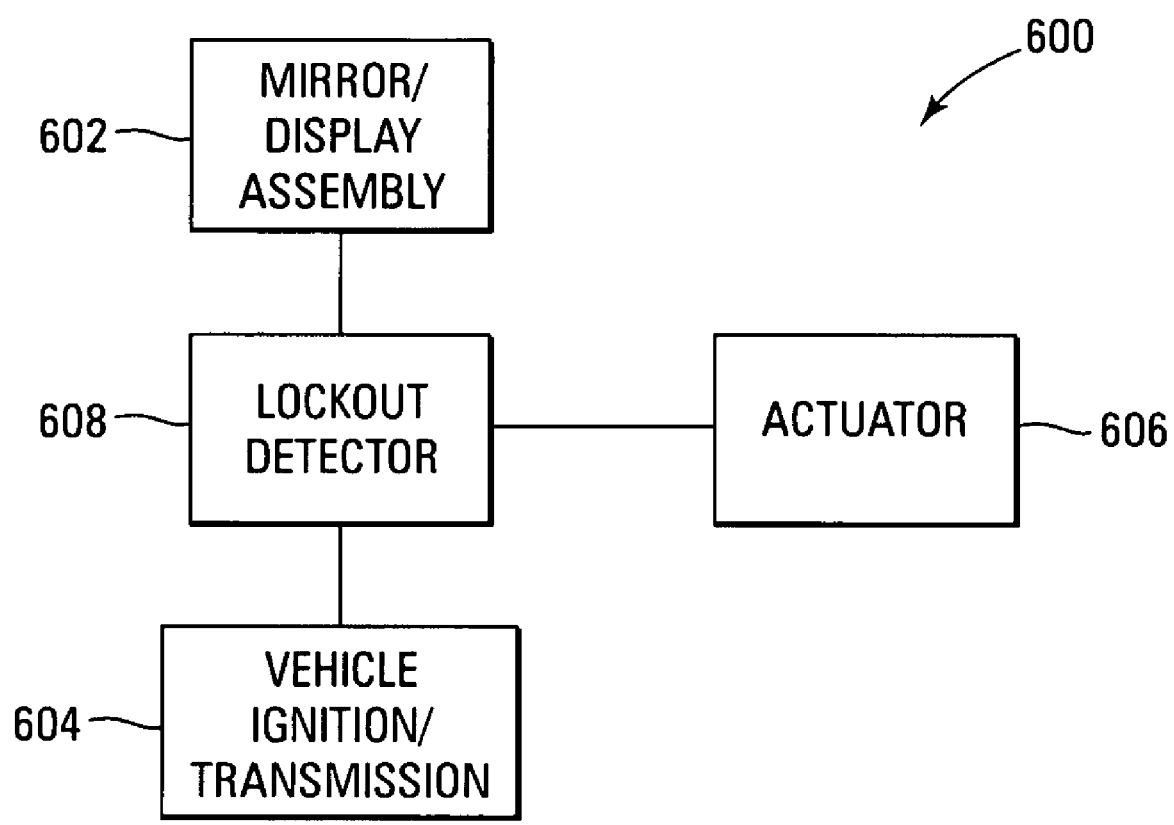
FIG. 6 is a block diagram of a system according to another embodiment of the present invention.

In one embodiment, the flip down display assembly, such as display 100 or 500, is operably connected to the ignition or transmission of the vehicle to allow the monitor to be locked in the retracted position via an electronic lockout when the vehicle is being used for normal driving. The display is released for operation in the extended, viewing position only when the vehicle is in a non-operating mode, such as when the vehicle is parked or the like. This interconnection is shown in block diagram in FIG. 6, in which mirror/display assembly 602 (such as one of assemblies 100 or 500) is operably connected to vehicle ignition 604. In operation, the mirror/display assembly 602 is operated as a mirror when the vehicle ignition 604 is in an "on" position for operation of the vehicle in normal driving mode. When the vehicle is in an "off" position, or not in a normal driving mode, such as is described above.

In various embodiments, the display portion of the assembly is moved from its retracted to its extended position by a motor or motorized mechanical actuator or the like upon either turning a vehicle key to a particular detent position in the ignition, or by the vehicle driver actuating an actuator button or other control 606 once the vehicle is in a non-driving mode. Such non-driving modes have been discussed in greater detail above. A lockout detector 608 in one embodiment determines the status of the vehicle, and enables the actuator 606 when the vehicle is in a mode allowing operation of the display in its extended mode of operation.

The embodiments of the present invention allow a vehicle rearview mirror and a display monitor to be mounted in a location at which a driver of the vehicle can see and use each depending upon the desired action the driver is taking. The rearview mirror portion of the embodiments of the present invention functions as a standard rearview mirror, providing a rear facing view of from the vehicle for the driver to use in driving. The monitor portion of the embodiments of the present invention allow the driver to view any number of items, such as navigational information, vehicle radio controls, internet, email, gaming, and the like on a display convenient to the driver's seat. The flip down monitor is mounted along with the rearview mirror in a convenient location for operation, but without substantially affecting field of view of the driver when the display is in the stored position.

The design of the mirror/display assembly embodiments of the present invention allows it to be mounted in a convenient location for viewing by a vehicle driver, but which remains out of the way for driving operation.

While use of the monitors of the various embodiments have been described only as being used while the vehicle is not in a driving operation mode, it should be understood that the monitor in the extended position may be used during some driving in some applications. For example, when the mirror/display assemblies of the various embodiments are mounted in a bus, truck, or other vehicle such that the mounting position to the windshield or windshield header structure is sufficiently high as to not impact forward visibility, the monitor can serve as an information display during driving. For vehicles in which the assembly is mounted where it interferes with visibility, the lockout system may be used.

The mirror/display assembly embodiments described herein may be used in any number of vehicles, including but not limited to land vehicles and aircraft. Still further, the mirror/display assembly embodiments of the present invention may also be integrated with an in-vehicle gaming system such as that shown and described in commonly owned U.S. patent application Ser. No. 11/317,676 entitled IN-VEHICLE GAMING SYSTEM. The monitor/display may be any type of display, including but not limited to an LCD screen, a touch screen, a tablet, a plasma screen, or the like.

CONCLUSION

A mirror assembly has been described that includes a rearview mirror integrated with a flip down display pivotally attached to the mirror, wherein the display is hidden from view of a driver in its retracted position, and is viewable by the driver in its extended position.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A mirror assembly for a vehicle, comprising:
a mounting frame; and
a display/mirror having a display and a mirror, the display pivotally attached at one end to the mounting frame and fixedly attached to the mirror at an opposing second end, the display/mirror movable between a first retracted position and a second extended position, wherein the reflective surface of the mirror substantially faces a rear of the vehicle when the display/mirror is in the first retracted position, and wherein the viewing surface substantially faces the rear of the vehicle when the display/mirror is in the second extended position.

2. The mirror assembly of claim 1, wherein the mirror is connected to the display to move about the pivot with the display between the first retracted position and the second extended position.

3. The mirror assembly of claim 1, wherein a reflective surface of the mirror and a viewing surface of the display are substantially perpendicular to one another in both the first retracted position and the second extended position.

4. The mirror assembly of claim 1, wherein the display/mirror is further rotatable when in the second extended position in a direction substantially perpendicular to a first pivotal motion.

5. The mirror assembly of claim 1, and further comprising:
a lockout detector electrically connected to the minor assembly, the lockout detector configured to prevent movement of the display/mirror from the first retracted position to the second extended position when the vehicle is in a driving mode.

6. A minor assembly for a vehicle, comprising:
a housing;
a display/mirror pivotally mounted to the housing, and movable about a pivot between a first retracted position and a second extended position, the display/mirror comprising:
  a display having a first edge pivotally mounted to the housing; and
  a mirror mounted to the display at a second edge of the display opposite the first edge, the mirror and the display mounted substantially perpendicular to each other, the minor having a reflective surface that substantially faces a rear of the vehicle when the display/mirror is in the retracted position, the display having a viewing surface that substantially faces the rear of the vehicle when the display/mirror is in the extended position.

7. A minor assembly for a vehicle, comprising:
a mounting frame;
a display/mirror, the display/mirror having a display pivotally attached to the mounting frame and a mirror attached to the display opposite attachment to the housing and at an angle to the display, the display/mirror movable between a first retracted position and a second extended position;
an actuator connected to the display/mirror to actuate movement of the display/mirror between the first and the second positions; and
a lockout mechanism to monitor an external vehicle status signal to prevent the actuator from moving the display/mirror from the first retracted position to the second extended position when the external vehicle status signal indicates that the vehicle is in a driving mode of operation.

8. The mirror assembly of claim 7, wherein the lockout mechanism monitors the vehicle through a connection to the vehicle ignition.

9. The mirror assembly of claim 7, wherein the angle between the display and the minor is about ninety degrees such that the display and mirror are substantially perpendicular to one another.

10. The mirror assembly of claim 9, wherein a reflective surface of the mirror substantially faces a rear of the vehicle when the display/mirror is in the retracted position, and wherein a viewing surface of the display faces the housing when the display/mirror is in the retracted position.

11. A minor assembly for a vehicle, comprising:
a housing;
a display pivotally mounted to a first end of the housing, and movable between a first retracted position in which a viewing surface of the display faces the housing and a second extended position in which the viewing surface faces a rear of the vehicle; and
a mirror pivotally mounted to a second end of the housing opposite the first end, the mirror movable between a first extended position and a second retracted position, the mirror having a reflective surface that substantially faces a rear of the vehicle when the minor is in its extended position and the display is in its retracted position, and the reflective surface facing a ceiling of the vehicle when the minor is in the retracted position and the display is in its extended position.

12. The mirror assembly of claim 11, wherein the reflective surface of the mirror and the viewing surface of the display are substantially perpendicular to one another when the minor is in the extended position and the display is in the retracted position.

13. A method of operating a mirror/display assembly in a vehicle comprising:
monitoring a driving mode and a non-driving mode of the vehicle with a lockout detector controller configured to monitor a position of a key in an ignition of the vehicle; and
controlling a position of the mirror/display assembly with the lockout detector controller, wherein the mirror/display assembly has a mounting frame and a display/mirror, the display/mirror having a display pivotally attached at one end to the mounting frame and a mirror attached to an opposing end of the display, the display/mirror movable with an actuator between a retracted position and an extended position, and wherein the controller allows movement of the mirror/display assembly to the retracted position for use as a rearview minor when the vehicle is in the driving mode of operation and allows movement of the mirror/display assembly with the actuator to the extended position wherein the mirror faces a floor of the vehicle and the display is configured for viewing only when the vehicle is in the non-driving mode of operation.

* * * * *